United States Patent
Ellison et al.

(10) Patent No.: US 7,073,071 B1
(45) Date of Patent: Jul. 4, 2006

(54) PLATFORM AND METHOD FOR GENERATING AND UTILIZING A PROTECTED AUDIT LOG

(75) Inventors: Carl M. Ellison, Portland, OR (US); Roger A. Golliver, Beaverton, OR (US); Howard C. Herbert, Phoenix, AZ (US); Derrick C. Lin, Foster City, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,612

(22) Filed: Mar. 31, 2000

(51) Int. Cl.
  *G06F 11/30* (2006.01)
  *G06F 12/14* (2006.01)
  *H04L 9/32* (2006.01)

(52) U.S. Cl. ........................ 713/193; 713/200

(58) Field of Classification Search .............. 713/193, 713/164, 165, 201, 200, 194, 340; 711/164, 711/156, 163, 173, 152, 153, 203, 206; 702/185; 710/36, 107, 262; 707/9; 726/26–30
See application file for complete search history.

(56) References Cited

U.S. PATENT DOCUMENTS

| | | | |
|---|---|---|---|
| 4,037,214 A | 7/1977 | Birney et al. | |
| 4,247,905 A | 1/1981 | Yoshida et al. | |
| 4,278,837 A | 7/1981 | Best | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,521,852 A | 6/1985 | Guttag | |
| 4,571,672 A | 2/1986 | Hatada et al. | |
| 4,759,064 A | 7/1988 | Chaum | |
| 4,795,893 A | 1/1989 | Ugon | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,255,379 A | 10/1993 | Melo | |
| 5,287,363 A * | 2/1994 | Wolf et al. | 714/718 |
| 5,293,424 A | 3/1994 | Holtey et al. | |
| 5,303,378 A | 4/1994 | Cohen | |

(Continued)

FOREIGN PATENT DOCUMENTS

DE 4217444 12/1992

(Continued)

OTHER PUBLICATIONS

J. Heinrich: "MIPS R4000 Microprocessor User's Manual," Apr. 1, 1993, MIPS, Mt-View, XP002184449, pp. 61-97.

(Continued)

*Primary Examiner*—Kim Vu
*Assistant Examiner*—Paula Klimach
(74) *Attorney, Agent, or Firm*—Michael R. Barre

(57) ABSTRACT

Briefly, one embodiment of a platform for generating and utilizing a protected audit log is described. The platform comprises a system memory and a memory to contain an audit log. The audit log includes a plurality of single-write, multiple read entries. At least one of the entries of the audit log includes stored data integrity information loaded into the system memory during its power cycle.

25 Claims, 11 Drawing Sheets

U.S. PATENT DOCUMENTS

| | | |
|---|---|---|
| 5,317,705 A | 5/1994 | Gannon et al. |
| 5,319,760 A | 6/1994 | Mason et al. |
| 5,386,552 A | 1/1995 | Garney |
| 5,421,006 A | 5/1995 | Jablon et al. |
| 5,437,033 A | 7/1995 | Inoue et al. |
| 5,455,909 A | 10/1995 | Blomgren et al. |
| 5,459,867 A | 10/1995 | Adams et al. |
| 5,459,869 A | 10/1995 | Spilo |
| 5,473,692 A | 12/1995 | Davis |
| 5,479,509 A | 12/1995 | Ugon |
| 5,504,922 A | 4/1996 | Seki et al. |
| 5,511,217 A | 4/1996 | Nakajima et al. |
| 5,522,075 A | 5/1996 | Robinson et al. |
| 5,568,552 A | 10/1996 | Davis |
| 5,606,617 A | 2/1997 | Brands |
| 5,615,263 A * | 3/1997 | Takahashi ............... 713/164 |
| 5,628,022 A | 5/1997 | Ueno et al. |
| 5,657,445 A | 8/1997 | Pearce |
| 5,668,971 A | 9/1997 | Neufeld |
| 5,717,903 A | 2/1998 | Bonola |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A * | 4/1998 | Jacks et al. ............... 714/722 |
| 5,757,919 A | 5/1998 | Herbert et al. |
| 5,764,969 A | 6/1998 | Kahle et al. |
| 5,796,845 A | 8/1998 | Serikawa et al. |
| 5,805,712 A | 9/1998 | Davis |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,872,994 A | 2/1999 | Akiyama et al. |
| 5,890,189 A | 3/1999 | Nozue et al. |
| 5,898,883 A | 4/1999 | Fujii et al. |
| 5,901,225 A | 5/1999 | Ireton et al. |
| 5,937,063 A | 8/1999 | Davis |
| 5,950,221 A | 9/1999 | Draves et al. |
| 5,953,502 A | 9/1999 | Helbig, Sr. |
| 5,970,147 A | 10/1999 | Davis |
| 5,978,481 A | 11/1999 | Ganesan et al. |
| 5,987,557 A | 11/1999 | Ebrahim |
| 6,014,745 A | 1/2000 | Ashe |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,092,095 A | 7/2000 | Maytal |
| 6,101,584 A | 8/2000 | Satou et al. |
| 6,115,816 A | 9/2000 | Davis |
| 6,125,430 A | 9/2000 | Noel et al. |
| 6,148,379 A | 11/2000 | Schimmel |
| 6,158,546 A | 12/2000 | Hanson et al. |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,192,455 B1 | 2/2001 | Bogin et al. |
| 6,205,550 B1 | 3/2001 | Nardone et al. |
| 6,212,635 B1 | 4/2001 | Reardon |
| 6,222,923 B1 | 4/2001 | Schwenk |
| 6,226,749 B1 | 5/2001 | Carloganu et al. |
| 6,249,872 B1 | 6/2001 | Wildgrube et al. |
| 6,269,392 B1 | 7/2001 | Cotichini et al. |
| 6,272,533 B1 | 8/2001 | Browne |
| 6,272,637 B1 | 8/2001 | Little et al. |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,314,409 B1 | 11/2001 | Schneck et al. |
| 6,321,314 B1 | 11/2001 | Van Dyke |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,412,035 B1 | 6/2002 | Webber |
| 6,421,702 B1 | 7/2002 | Gulick |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,535,988 B1 | 3/2003 | Poisner |
| 6,557,104 B1 | 4/2003 | Vu et al. |
| 6,560,627 B1 * | 5/2003 | McDonald et al. ......... 718/103 |
| 6,633,981 B1 | 10/2003 | Davis |
| 6,651,171 B1 * | 11/2003 | England et al. ............. 713/193 |
| 6,701,284 B1 * | 3/2004 | Huntley et al. ............. 702/187 |
| 2001/0021969 A1 | 9/2001 | Burger et al. |
| 2001/0027527 A1 | 10/2001 | Khidekel et al. |
| 2001/0037450 A1 | 11/2001 | Metlitski et al. |

FOREIGN PATENT DOCUMENTS

| | | |
|---|---|---|
| EP | 0473913 | 3/1992 |
| EP | 0600112 | 8/1994 |
| EP | 0930567 A | 7/1999 |
| EP | 1 030 237 A | 8/2000 |
| EP | 1146715 | 10/2001 |
| JP | 11161521 A * | 6/1999 |
| JP | 02000076139 A | 3/2000 |
| WO | WO 97/29567 | 8/1997 |
| WO | WO9834365 A | 8/1998 |
| WO | WO9844402 | 10/1998 |
| WO | WO9905600 | 2/1999 |
| WO | WO9909482 | 2/1999 |
| WO | WO 99/38076 | 7/1999 |
| WO | WO9957863 | 11/1999 |
| WO | WO0062232 | 10/2000 |
| WO | WO 01/27821 A | 4/2001 |
| WO | WO 0127723 A | 4/2001 |
| WO | WO 01 75564 A | 10/2001 |
| WO | WO 01/75565 | 10/2001 |
| WO | WO 0175595 | 10/2001 |
| WO | WO 02 17555 A | 2/2002 |
| WO | WO 02 086684 A | 10/2002 |

OTHER PUBLICATIONS

"M68040 User's Manual", 1993, Motorola Inc., p. 1-5-p. 1-9, p. 1-13-p. 1-20, p. 2-1-p. 2-3, p. 4-1, p. 8-9-p. 8-11.

"Intel 386 DX Microprocessor 32-Bit CHMOS Microprocessor With Integrated Memory Management", Dec. 31, 1995, Intel Inc., p. 32-56; figure 4-14.

Joe Heinrich:"MIPS R4000 Microprocessor User's Manual", 1994, MIPS Technology Inc., Mountain View, CA, pp. 67-79.

Berg C: "How do I Create a Signed Applet?", Dr. Dobb's Journal, M&T Publ., Redwood City, CA, US, vol. 22, No. 8, 8 '97, p. 109-111, 122.

Gong L et al: "Going Beyond the Sandbox: an Overview of the New Security Architecture in the Java Development Kit 1.2", Proceedings of the Usenix Symposium on Internet Technologies and Systems, Montery, CA 12 '97, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Brands, Stefan, "Restrictive Blinding of Secret-Key Certificates", *Springer-Verlag XP002201306*, (1995), Chapter 3.

Davida, George I., et al., "Defending Systems Against Viruses through Cryptographic Authentication", *Proceedings of the Symposium on Security and Privacy,* IEEE Comp. Soc. Press, ISBN 0-8186-1939-2,(May 1989).

Kashiwagi, Kazuhiko, et al., "Design and Implementation of Dynamically Reconstructing System Sofware", *Software Engineering Conference,* Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine,* XP002190614,(Mar. 1999).

Menezes, Oorschot, "Handbook of Applied Cryptography", *CRC Press LLC, USA XP002201307,* (1997),475.

Richt, Stefan, et al., "In-Circuit-Emulator Wird Echtzeittauglich", *Elektronic, Franzis Verlag GMBH, Munchen, DE,* vol. 40, No. 16, XP000259620,(100-103), Aug. 6, 1991.

Saez, Sergio, et al., "A Hardware Scheduler for Complex Real-Time Systems", *Proceedings of the IEEE International Symposium on Industrial Electronics,* XP002190615,(Jul. 1999),43-48.

Sherwood, Timothy, et al., "Patchable Instruction ROM Architecture", *Department of Computer Science and Engineering, University of California, San Diego, La Jolla, CA,* (Nov. 2001).

* cited by examiner

PLATFORM AND METHOD FOR GENERATING AND UTILIZING A PROTECTED AUDIT LOG

BACKGROUND

1. Field

This invention relates to the field of platform security.

2. Background

Advances in technology have opened up many opportunities for applications that go beyond the traditional ways of doing business. Electronic commerce (e-commerce) and business-to-business (B2B) transactions are now becoming popular, reaching the global markets at a fast rate. Unfortunately, while electronic platforms like computers provide users with convenient and efficient methods of doing business, communicating and transacting, they are also vulnerable for unscrupulous attacks. Examples of these attacks include virus, intrusion, security breach, and tampering, to name a few. Therefore, it is becoming more and more important to protect the integrity of data stored within or downloaded into a platform.

Various cryptographic mechanisms may be used to protect the integrity of data. One type of cryptographic mechanism involves the use of authorization certificates to provide sufficient protection during a boot cycle of a platform. For example, an "authorization certificate" can provide verifiable evidence of which software modules are authorized to run on a platform. Although these authorization certificates provide some levels of platform security, they are quite restrictive because no new software modules can be run without prior approval from a certificate issuer with the requisite authority. This requirement would greatly impede current software development and the on-going progression toward open software.

BRIEF DESCRIPTION OF THE DRAWINGS

The features and advantages of the present invention will become apparent from the following detailed description of the present invention in which.

DESCRIPTION

Figure 1A:
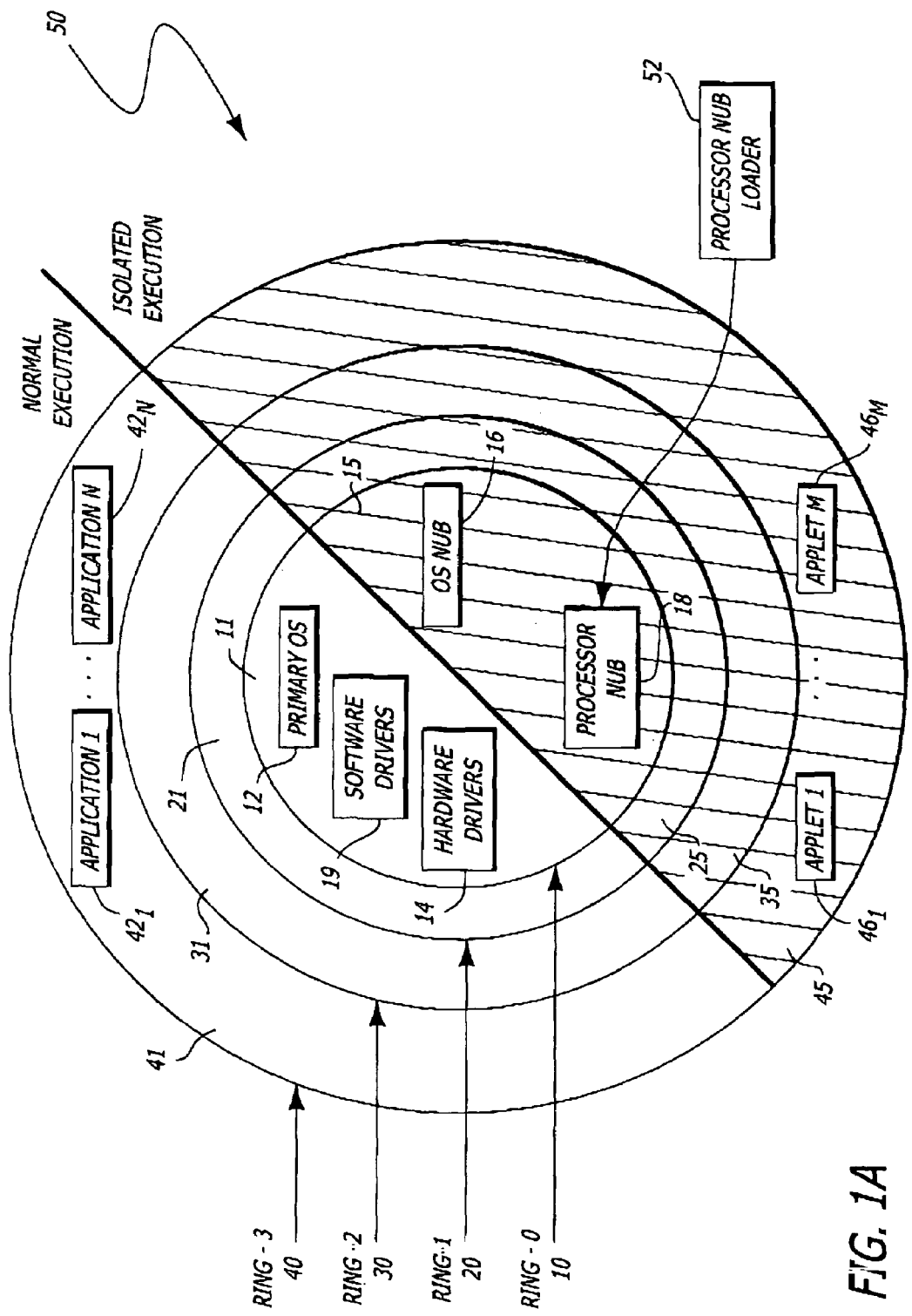
FIG. 1A is a diagram illustrating an embodiment of the logical operating architecture for the ISOX™ architecture of the platform.

The present invention relates to a platform and method for generating and utilizing a protected audit log to enhance security. Herein, certain details are set forth in order to provide a thorough understanding of the present invention. It is apparent to a person of ordinary skill in the art, however, that the present invention may be practiced through many embodiments other that those illustrated. Well-known circuits and hashing techniques are not set forth in detail in order to avoid unnecessarily obscuring the present invention.

In the following description, terminology is used to discuss certain features of the present invention. For example, a "platform" includes hardware equipment and/or software that perform different functions on stored information. Examples of a platform include, but are not limited or restricted to a computer (e.g., desktop, a laptop, a hand-held, a server, a workstation, etc.), desktop office equipment (e.g., printer, scanner, a facsimile machine, etc.), a wireless telephone handset, a television set-top box, and the like. A "software module" includes code that, when executed, performs a certain function. A "nub" is a series of code instructions, possibly a subset of code from an applet acting as a lesser sized software module. A "link" is broadly defined as one or more information-carrying mediums (e.g., electrical wire, optical fiber, cable, bus, or wireless signaling technology).

In addition, the term "information" is defined as one or more bits of data, address, and/or control. A "segment" is one or more bytes of information. A "page" is a predetermined number of bytes, usually a power of two in length (e.g., 512, 1024, etc.). A "hash function" is a function, mathematical or otherwise, that performs a one-way conversion of information to a fixed-length representation. Normally, this representation, referred to as a "hash value" or a "digest", is substantially less in size than the original information. It is contemplated that, in some cases, a 1:1 conversion of the original information may be performed.

I. Architecture Overview

A. Isolated Execution Platform

One principle for providing additional platform security is through configuration of the platform with an isolated execution (ISOX™) architecture. The ISOX™ architecture includes logical and physical definitions of hardware and software components that interact directly or indirectly with an operating system of a platform. Herein, the operating system and a processor of the platform may have several levels of hierarchy, referred to as rings, which correspond to various operational modes. A "ring" is a logical division of hardware and software components that are designed to perform dedicated tasks within the operating system. The division is typically based on the degree or level of privilege, namely the ability to make changes to the platform. For example, a ring-0 is the innermost ring, being at the highest level of the hierarchy. Ring-0 encompasses the most critical, privileged components. Ring-3 is the outermost ring, being at the lowest level of the hierarchy. Ring-3 typically encompasses user level applications which are normally given the lowest level of privilege. Ring-1 and ring-2 represent the intermediate rings with decreasing levels of privilege.

FIG. 1A is a diagram illustrating an embodiment of a logical operating architecture 50 of the ISOX™ architecture. The logical operating architecture 50 is an abstraction of the components of an operating system and the processor. The logical operating architecture 50 includes ring-0 10, ring-1 20, ring-2 30, ring-3 40, and a processor nub loader 52. The logical operating architecture 50 has at least two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system. Typically, these software modules include a primary operating system 12 referred to as the "kernel" (e.g., the unprotected segments of the operating system), software drivers 13, and hardware drivers 14. The isolated execution Ring-0 15 includes an operating system (OS) nub 16 and a processor nub 18 as described below. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within the chipset itself and is responsible for loading the processor nub 18 from the processor or chipset into an isolated area as further described below.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$–$42_N$ and isolated execution ring-3 includes M applets $46_1$–$46_M$ (where "N" and "M" are positive whole numbers).

One concept of the isolated execution architecture is the creation of a region in system memory protected by the processor and/or chipset in the platform. This region of protected memory is referred to as an "isolated area". Access to the isolated area is permitted using special memory read and write cycles, which are referred to as "isolated read and write" cycles. The isolated read and write cycles are issued by the processor operating in the isolated execution mode.

The processor nub loader 52 verifies and loads a ring-0 nub software module (e.g., processor nub 18) into the isolated area. The processor nub 18 provides the basic hardware-related services to support isolated execution. For example, one task of the processor nub 18 is to verify and load the ring-0 OS nub 16 into the isolated area 70 as shown in FIG. 1B.

The OS nub 16 provides links to services in the primary operating system 12, provides page management within the isolated area, and has the responsibility for loading some ring-0 software modules as well as ring-3 software modules 45 (e.g., $46_1$–$46_M$) into protected pages allocated in the isolated area. The OS nub 16 may also support encrypting and hashing the isolated area pages before evicting the page(s) to the ordinary (unprotected) memory, and/or checking the page contents upon restoration of the page.

Figure 1B:
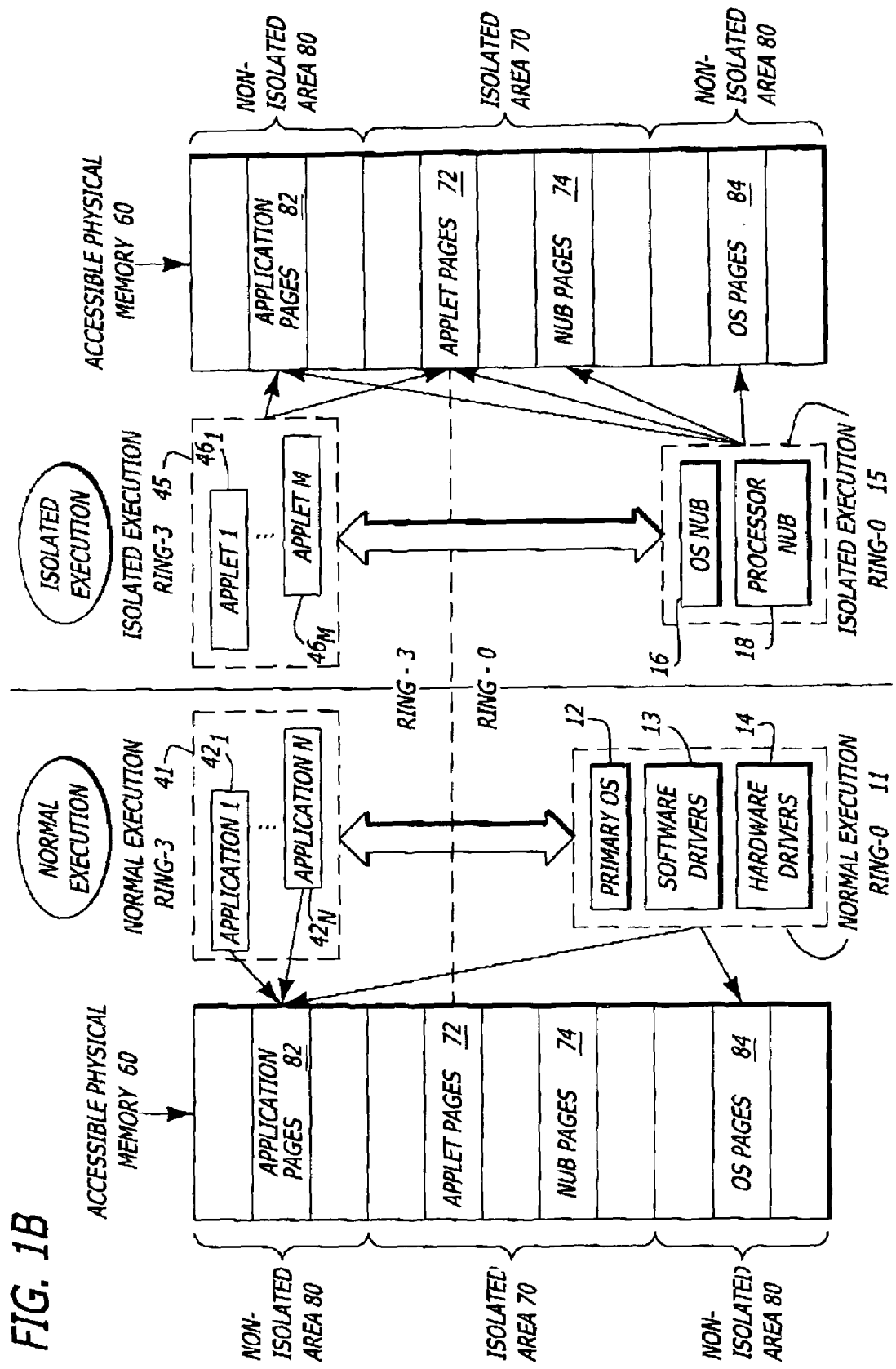
FIG. 1B is an illustrative diagram showing the accessibility of various elements in the operating system and the processor according to one embodiment of the invention.

FIG. 1B is an illustrative diagram showing the accessibility of various elements in the operating system 10 and the processor according to one embodiment of the invention. For clarity sake, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system (OS) pages 84. The isolated area 70 is accessible only to elements of the operating system and processor operating in isolated execution mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$–$42_N$, can access only to the application pages 82. Neither the normal execution ring-0 11 nor ring-3 41, however, can access the isolated area 70.

The isolated execution ring-0 15, including the OS nub 16 and the processor nub 18, can access both the isolated area 70 (including the applet pages 72 and the nub pages 74) and the non-isolated area 80 (including the application pages 82 and the OS pages 84). The isolated execution ring-3 45, including applets $46_1$–$46_M$, can access only the application pages 82 and the applet pages 72. The applets $46_1$–$46_M$ reside in the isolated area 70.

Figure 1C:
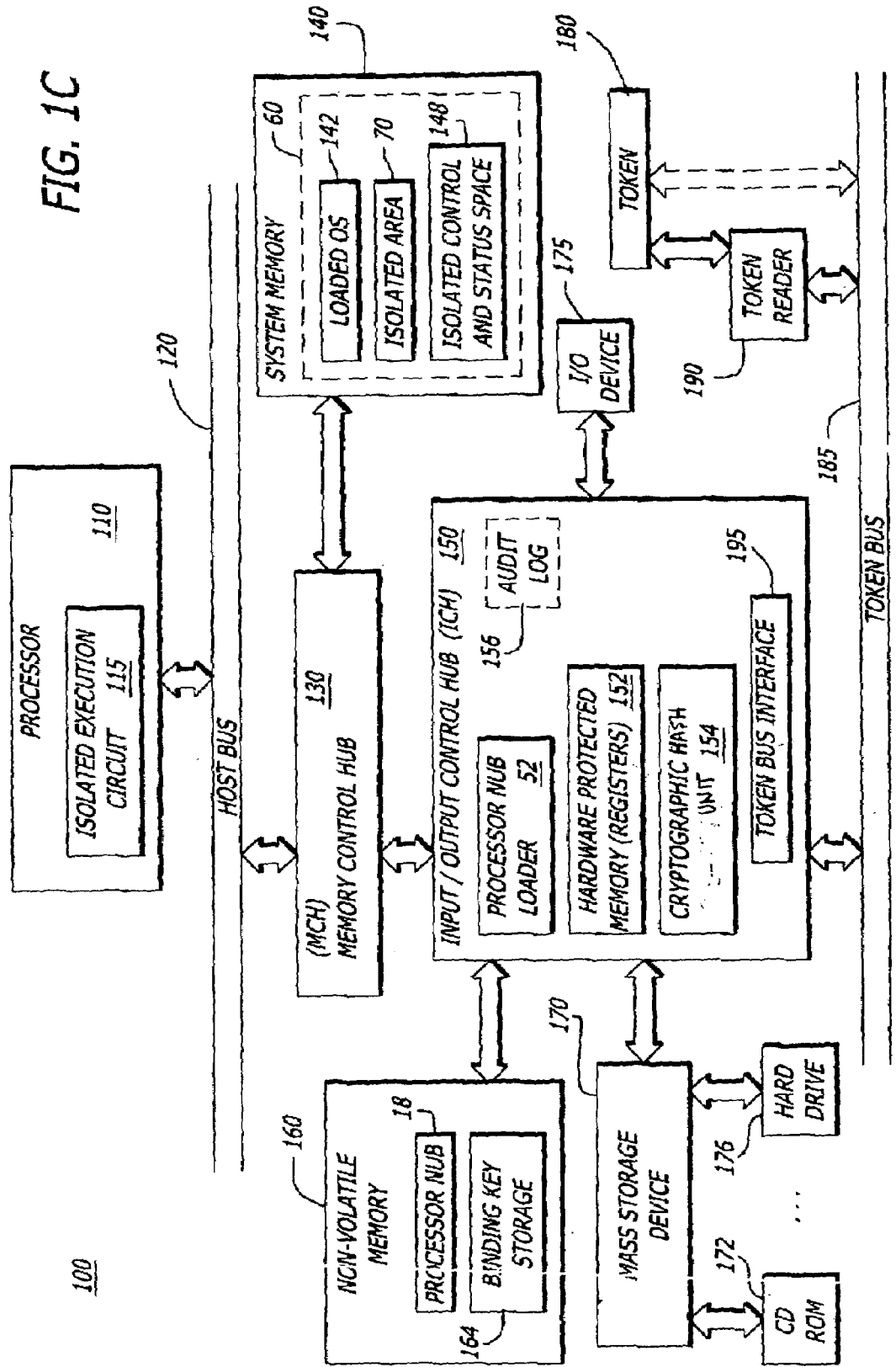
FIG. 1C is a first block diagram of an illustrative embodiment of a platform utilizing the present invention.

Referring to FIG. 1C, a first block diagram of an illustrative embodiment of a platform utilizing the present invention is shown. The platform 100 comprises a processor 110, a system memory 140 and an input/output control hub (ICH) 150 in communication with each other. In this embodiment, however, the platform 100 further includes a memory control hub (MCH) 130 and a non-volatile memory (e.g., flash) 160 coupled to the ICH 150. The MCH 130 is further coupled to the processor 110 via a host bus 120. The ICH 150 may be integrated into a chipset together or separate from the MCH 130.

It is contemplated that the platform 100 may be in communication with peripheral components such as a mass storage device 170, one or more input/output (I/O) devices 175, and a token 180 via a token bus 185 and/or a token reader 190. For clarity, the specific links for these peripheral components (e.g., Peripheral Component Interconnect "PCI", accelerated graphics port "AGP", Industry Standard Architecture "ISA", Universal Serial Bus "USB", etc.) are not shown.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 includes an isolated execution circuit 115. The isolated execution circuit 115 provides a mechanism to allow the processor 110 to operate in an isolated execution mode. The isolated execution circuit 115 provides hardware and software support for the isolated execution mode. This support includes configuration for isolated execution, definition of the isolated area, definition (e.g., decoding and execution) of isolated instructions, generation of isolated access bus cycles, and generation of isolated mode interrupts.

The host bus 120 provides interface signals to allow the processor 110 to communicate with other processors or devices, e.g., the MCH 130. In addition to normal mode, the host bus 120 supports an isolated access bus mode with corresponding interface signals for isolated read and write cycles when the processor 110 is configured in the isolated execution mode. The isolated access bus mode is asserted on memory accesses initiated while the processor 110 is in the isolated execution mode if the physical address falls within the isolated area address range. The isolated access bus mode is also asserted on instruction pre-fetch and cache write-back cycles if the address is within the isolated area address range. The processor 110 responds to snoop cycles to a cached address within the isolated area address range if the isolated access bus cycle is asserted.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area when the isolated access bus mode is not asserted.

The system memory 140 stores code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system (OS) 142, the isolated area 70 (shown in FIG. 1B), and an isolated control and status space 148. The loaded OS 142 is the portion of the operating system that is loaded into the system memory 140. The loaded OS 142 is typically loaded from mass storage device 170 via some boot code in a boot storage such as a boot read only memory (ROM).

As shown in FIGS. 1B and 1C, the isolated area 70 is the memory area that is defined by the processor 110 when operating in the isolated execution mode. Access to the isolated area 70 is restricted and is enforced by the processor 110 and/or the MCH 130 or other chipset that integrates the isolated area functionalities.

Referring back to FIG. 1C, the isolated control and status space 148 is an input/output (I/O)-like, independent address space defined by the processor 110 and/or the MCH 130. The isolated control and status space 148 contains (i) isolated execution control and status registers, and (ii) related initialization code invoked directly by the isolated instructions executed by the processor 110. The isolated control and status space 148 does not overlap any existing address space and is accessed using the isolated bus cycles. The system memory 140 may also include other programs or data that are not shown.

As shown in FIG. 1C, the ICH 150 has a number of functionalities that are designed to support isolated execution in addition to the traditional I/O functions. In this embodiment, the ICH 150 comprises at least the processor nub loader 52 (shown in FIG. 1A), a hardware-protected memory 152, and a cryptographic hash unit 154. For clarity, only one ICH 150 is shown although platform 100 may be implemented with multiple ICHs. When there are multiple ICHs, a designated ICH is selected to control the isolated area configuration and status. This selection may be performed by an external strapping pin. As is known by one skilled in the art, other methods of selecting can be used.

The processor nub loader 52, as shown in FIGS. 1A and 1C, includes a processor nub loader code and its hash value (or digest). After being invoked by execution of an appropriate isolated instruction (e.g., ISO_INIT) by the processor 110, the processor nub loader 52 is transferred to the isolated area 70. Thereafter, the processor nub loader 52 copies the processor nub 18 from the non-volatile memory 160 into the isolated area 70, verifies and places the hash value of the processor nub 18 into some hardware-protected memory. The hardware-protected memory 152 is implemented as any memory array with single write, multiple read capability. This non-modifiable capability is controlled by logic or is part of the inherent nature of the memory itself. For example, as shown, the protected memory 152 may include a plurality of single write, multiple read registers.

The cryptographic hash unit 154 includes logic that performs a one-way hash function on input information. The term "one-way" indicates that there does not readily exist an inverse function to recover any discernible portion of the original information from the fixed-length hash value. Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

Figure 3:
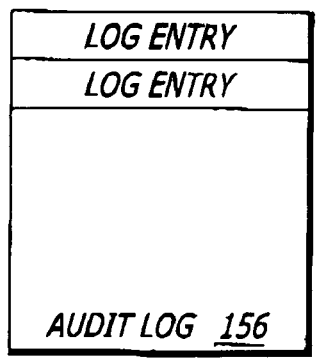
FIG. 3 is a block diagram of an illustrative embodiment of an audit log.

As shown in FIGS. 1C and 3, the protected memory 152 is configured to operate as an audit log 156. An "audit log" 156 is a listing of information that represents (or identifies) what information has been successfully loaded into the system memory 140, normally in the isolated area 70, after power-on of the platform 100. This information, referred to as a "log entry," is information of interest to a verifier of the audit log 156, presumably including a hash of data, of a software module, or of any other information. For example, the log entry may include a hash of a software module and a ring number on which the software module is authorized to run during the current power cycle of the platform 100. These software modules may include the processor nub 18, the OS nub 16, and/or any other critical software modules (e.g., ring-0 modules) loaded into the isolated area 70. Thus, the audit log 156 can act as a fingerprint that identifies information loaded into the platform (e.g., the ring-0 code controlling the isolated execution configuration and operation), and is used to attest or prove the state of the current isolated execution.

Figure 4A:
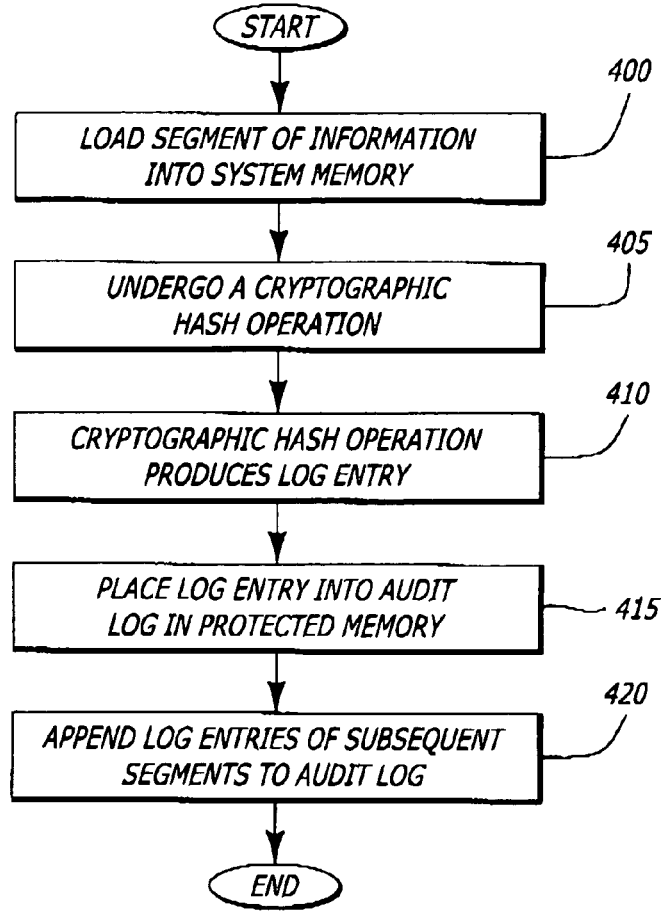
FIG. 4A is a flowchart of the illustrative operations of the platform to generate a protected audit log.
Figure 4B:
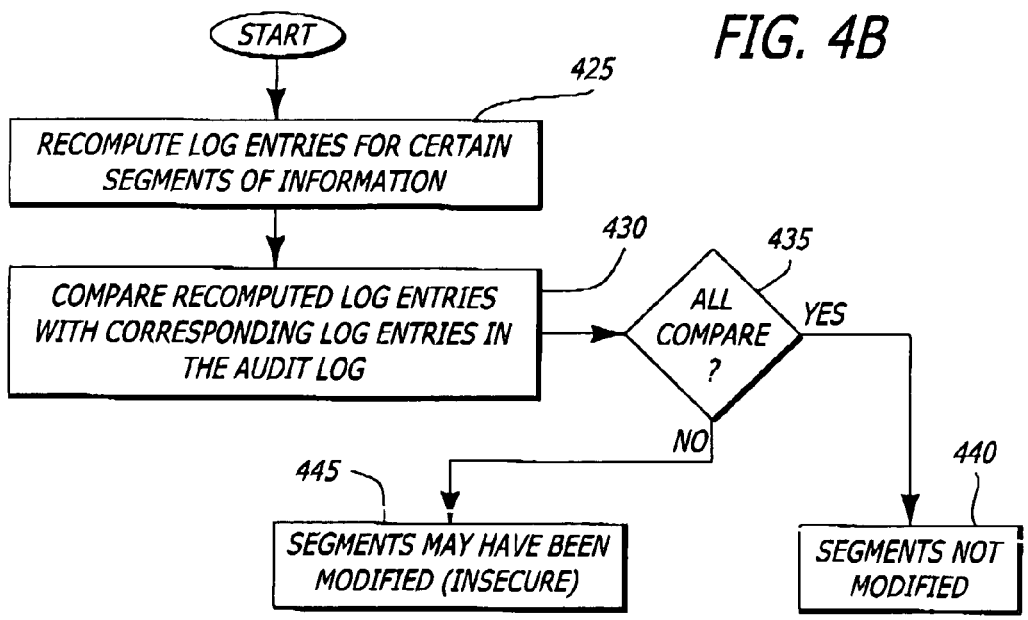
FIG. 4B is a flowchart of the illustrative operations of the platform to utilize the protected audit log.

In another embodiment as further described in FIGS. 4A and 4B, both the protected memory 152 and unprotected memory (e.g., a memory array in the non-isolated area 80 of the system memory 140 of FIG. 1B) may be collectively utilized to provide a protected audit log 156. Instead of storing the entire audit log 156 in protected memory 152, a pointer to the beginning of a memory array in the unprotected memory is stored in the protected memory 152. In addition, the length of the audit log 156 and a hash value of the contents of the audit log 156 may be stored with the pointer.

In yet another embodiment as further described in FIG. 5, both the protected memory 152 and the unprotected memory may be collectively utilized to provide a protected audit log 156. While a memory array in the unprotected memory would store the audit log, the protected memory 152 would store a state value. As an option, the length of the audit log 156 and/or the total hash value may be stored in protected memory 152.

Referring still to FIG. 1C, the non-volatile memory 160 stores non-volatile information. Typically, the non-volatile memory 160 is implemented in flash memory. The non-volatile memory 160 includes the processor nub 18 and a binding key storage 164. The processor nub 18 provides the initial set-up and low-level management of the isolated area 70 of the system memory 140, including verification, loading, and logging of the OS nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$–$42_N$), applets (e.g., applets $46_1$ to $46_M$) and operating systems. The mass storage device 170 may include a compact disk (CD) ROM 172, a hard drive 176, or any other magnetic or optic storage devices. The mass storage device 170 also provides a mechanism to read processor readable medium. When implemented in software, the elements of the present invention are stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc.

I/O devices 175 may include any I/O devices to perform I/O functions. Examples of I/O devices 175 include controller for input devices (e.g., keyboard, mouse, trackball, pointing device), media card (e.g., audio, video, graphics), communication card (e.g., network. modem, etc.), and any other peripheral controllers.

The token bus 185 provides an interface between the ICH 150 and one or more tokens 180 in the system. The "token" 180 is a device that performs dedicated I/O functions with security. The token 180 may be stationary (e.g., a motherboard token) or portable when coupled via the token reader 190. The token bus interface 195 in the ICH 150 couples the token bus 180 to the ICH 150 and ensures that when commanded to prove the state of the isolated execution, the corresponding token 180 signs only valid isolated digest information.

B. Standard Platform

Figure 2:
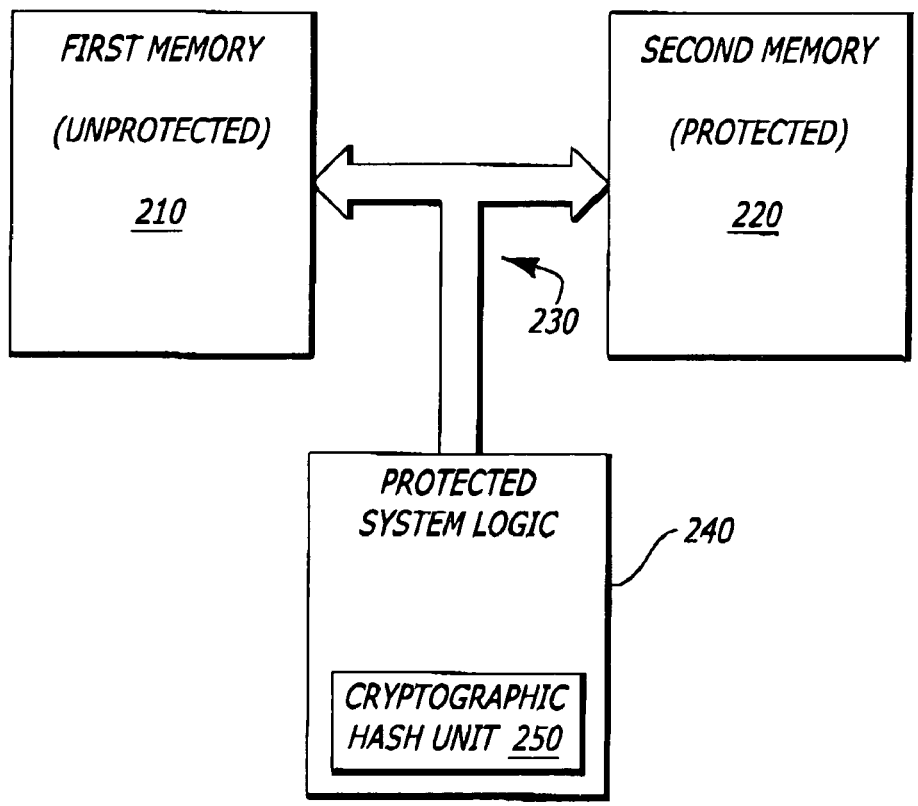
FIG. 2 is a second block diagram of an illustrative embodiment of a platform utilizing the present invention.

Referring to FIG. 2, a second block diagram of an illustrative embodiment of a platform utilizing the present invention is shown. The platform 200 includes a first (unprotected) memory 210 and a second (protected) memory 220 coupled together by one or more links 230. The access to contents stored in the second memory 220 is controlled by protected system logic 240 (e.g., an integrated circuit, combinatorial elements, and/or software). It is contemplated that the logic 240 includes a hash unit 250, which produces hash values of information loaded therein. Logic 240 may be placed physically separate from the second memory 220 as shown or contained within the same package. The techniques for generating and utilizing a protected audit log are also set forth in FIGS. 4A–10.

II. Generating and Utilizing a Protected Audit Log

Referring now to FIG. 4A, a flowchart of the illustrative operations of the platform to generate a protected audit log is shown. After power-on of the platform, segments of information are loaded into the system memory for processing by a processor (block 400). Each segment of information may be a portion of the operating system, a software module, a nub, an applet, and the like. Concurrent with their loading into the system memory, these segments of information undergo a cryptographic hash operation to produce log entries (blocks 405 and 410). The log entries are placed into the audit log in protected memory (block 415). The memory is deemed "protected" when the contents of the memory are readable and non-modifiable as described above. As subsequent segments of information are being loaded into system memory, their log entries are concurrently appended to the audit log behind the previously appended log entries (block 420).

As shown in FIG. 4B, a flowchart of the illustrative operations of the platform to utilize the protected audit log is shown. To determine whether certain segments of information were loaded without authorization, the log entries for these certain segments would be re-computed and compared to corresponding log entries recovered from the audit log (blocks 425 and 430). If none of the re-computed log entries differ from its corresponding log entry, then the segments of information have not been modified (blocks 435 and 440). In general, if we determine that the information loaded into the isolated area includes only segments of information that are known to be safe (e.g., recognized as being an approved software module, does not match a known virus, compares with a recognized log entry, etc.), then the entire area is safe. However, if any recovered log entry differs from its re-computed log entry value, an error signal is provided to indicate that the information loaded into the isolated area is not known to be safe (block 445). Then, the isolated area should be treated as if it is insecure.

Figure 5A:
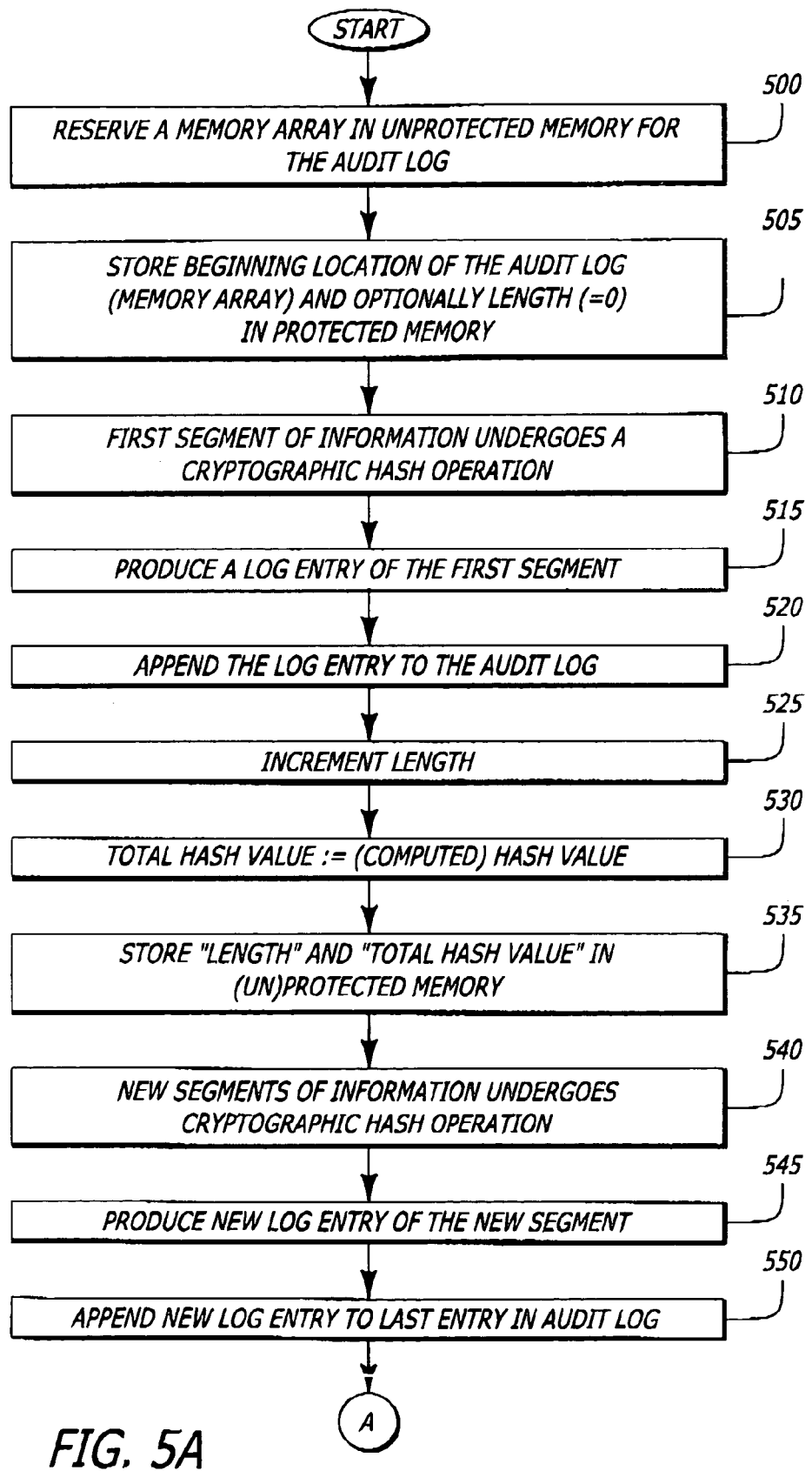
FIGS. 5A and 5B are illustrative flowcharts of a first embodiment of a platform supporting the generation of a protected audit log utilizing both protected and unprotected memory.
Figure 5B:
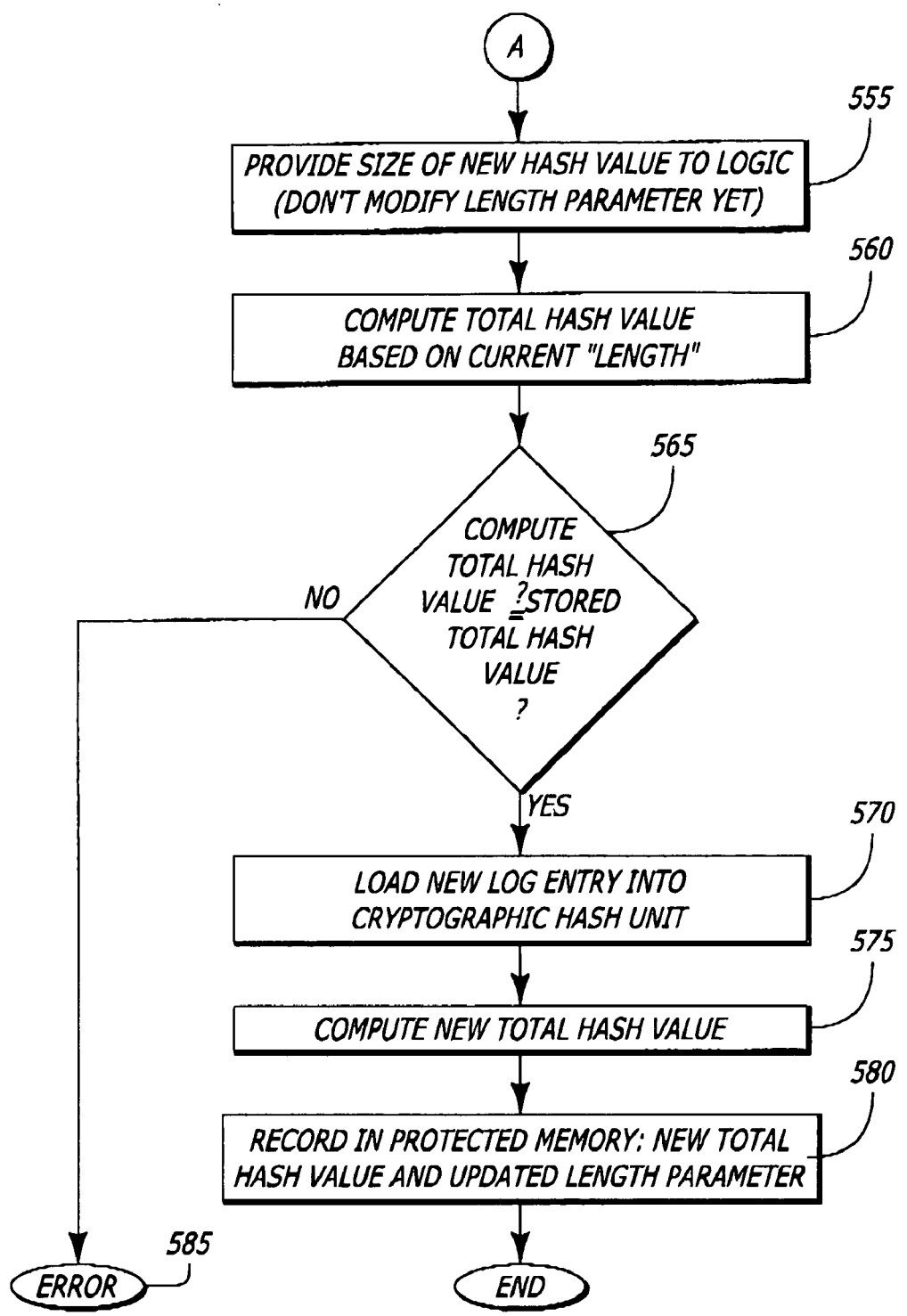

Referring to FIGS. 5A and 5B, illustrative flowcharts of a first embodiment of the operations of the platform to generate a protected audit log utilizing both protected and unprotected memory is shown. After power-on of the platform, memory space in unprotected memory is reserved for a memory array configured to store an audit log having data that represents what information has been successfully loaded into the system memory during the current power cycle, namely after power-on of the platform (block 500). The beginning location of the audit log (e.g., a pointer) is stored in protected memory possibly with the length of the audit log (block 505). Of course, the length may be any measurable unit (e.g., bytes).

Thereafter, segments of information are loaded into the system memory, such as the isolated area for example, for processing by a processor. Each segment of information may be a portion of the operating system, a software module such as a nub, an applet and the like. In particular, the first segment of information undergoes a cryptographic hash operation upon being loaded into system memory (block 510). This produces a log entry of the first segment and this log entry is appended to the audit log stored in the unprotected memory (blocks 515 and 520). The length parameter is incremented by the size of the log entry and the total hash value of the audit log is equivalent to the computed hash value of the first segment (blocks 525 and 530). Both the length parameter and the total hash value are stored in either protected or unprotected memory (block 535).

Subsequently, a new segment of information undergoes a cryptographic hash operation within the platform (block 540). This produces a new log entry of the new segment and the new log entry is appended into the audit log (blocks 545 and 550). The logic responsible for controlling access to the protected memory is provided with the size (e.g., number of bytes) of the new log entry but the length parameter is not yet incremented (block 555).

The cryptographic hash unit computes the total hash value for the entire audit log by reloading the log entries stored in the audit log starting at the beginning location of the memory array and ending with the entry prior to the new log entry, as determined by the length parameter (block 560). If the computed hash value matches the total hash value, the new log entry is loaded into the cryptographic hash unit to compute the new total hash value (blocks 565, 570 and 575). Thereafter, the new total hash value and the updated length parameter (old length plus the additional bytes associated with the new hash value) are recorded in the protected memory (blocks 580). If the computed hash value differs from the total hash value, an error is reported (block 585).

Figure 8:
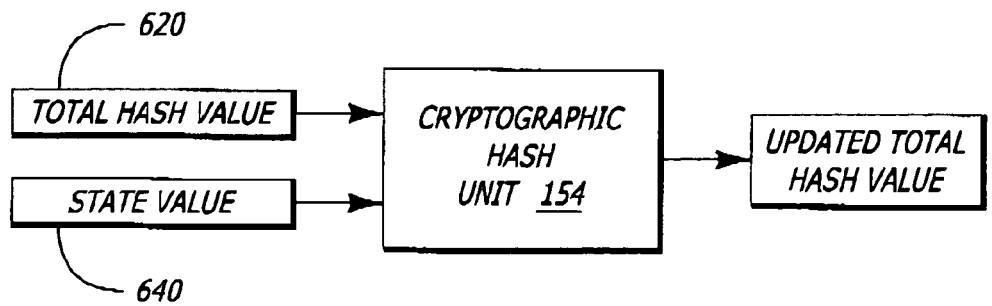
FIG. 8 is a block diagram of an illustrative embodiment for producing an updated total hash value based on the current total hash value and the state value.

Referring to FIGS. 6–9B, an illustrative diagram of a second embodiment of the operations of the platform to generate a protected audit log utilizing both protected and unprotected memory is shown. Herein, the protected memory 152 includes (i) a beginning location 600 of a memory array of unprotected memory (i) the audit log, (ii) a state 630, and optionally (iii) a current length of the audit log 610 and (iv) a total hash value of the contents of the audit log 620, as identified by dashed lines. The "state" includes a state value 640 being a series of log entries stored in a block of memory (e.g., 64 bytes). The placement of the log entries is controlled by a state pointer 650 as further shown in FIG. 7. When the memory block becomes full (e.g., the pointer has come to the end of the memory block), logic may be used to compute an updated total hash value based on the current total hash value 620 and the state value 640 as shown in FIG. 8.

Figure 9A:
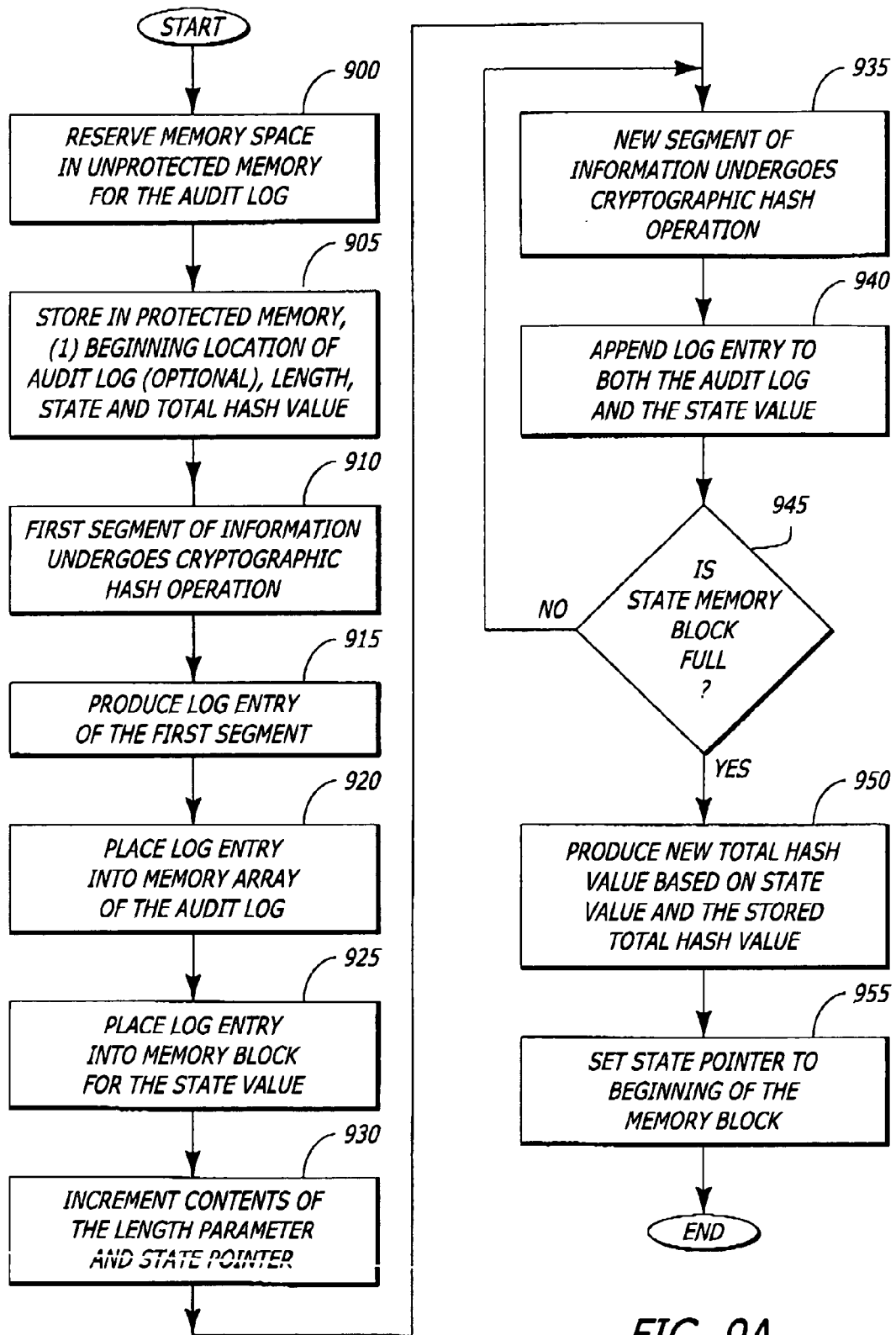
FIG. 9A is a flowchart of the illustrative operations of the platform of FIG. 6 to generate a protected audit log.

More specifically, as shown in FIG. 9A, after power-on of the platform, memory space in unprotected memory is reserved for a memory array configured to store an audit log having data that represents what information has been successfully loaded into the system memory (block 900). The beginning location of the memory array is stored in protected memory along with the state value and possibly contents of the length parameter of the audit log (block 905).

Thereafter, segments of information are loaded into the system memory for processing by a processor. In particular, a segment of information is undergoes a cryptographic hash operation, possibly performed by a software module stored in the isolated area (block 910). Thereafter, a log entry of the first segment is produced as a result of the cryptographic hash operations and this log entry is appended into both the audit log in unprotected memory and the memory block storing the state value (blocks 915, 920 and 925). The length parameter and the state pointer are incremented by the size of the log entry (block 930).

Figure 6:
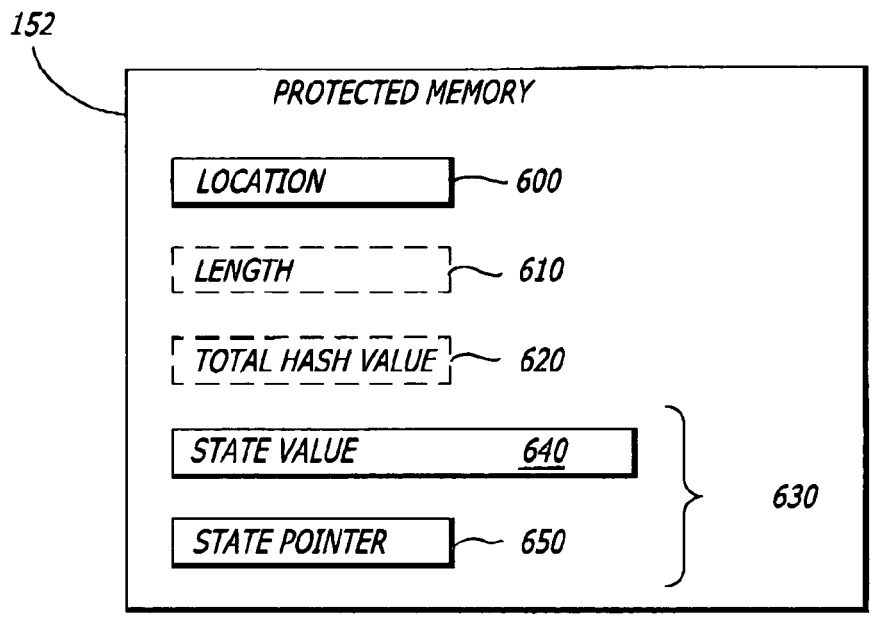
FIG. 6 is an illustrative embodiment of the contents of the protected memory supporting a second embodiment of the platform supporting the generation and utilization of a protected audit log.
Figure 7:
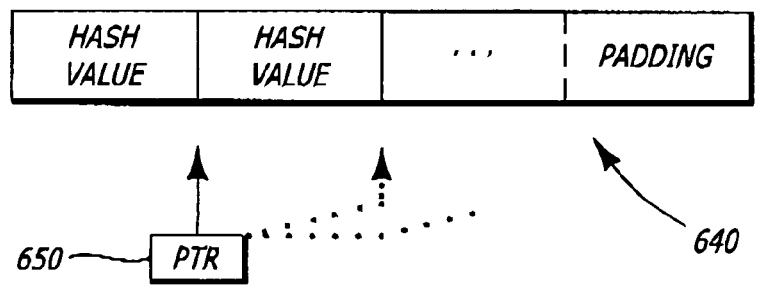
FIG. 7 is an illustrative embodiment of a memory block storing a state value of the platform.

Thereafter, new segments of information undergo the cryptographic hash operations (block 935). The cryptographic hash operations produce a log entry of each new segment and that log entry is appended to the listing in unprotected memory and placed in the memory block as shown in FIG. 6 (block 940). When the logic responsible for updating the total hash value determines that the state memory is full or is sufficiently full where padding is used, the cryptographic hash unit performs a cryptographic operation on both total hash value currently stored (see element 620 of FIG. 6) and the state value to produce a new total hash value (blocks 945 and 950). Then, the state pointer is set to the beginning of the state memory block (block 955). This is advantageous because the cryptographic hash unit does not need to re-compute the total hash value from the audit log saved in unprotected memory for each segment of information loaded.

Figure 9B:
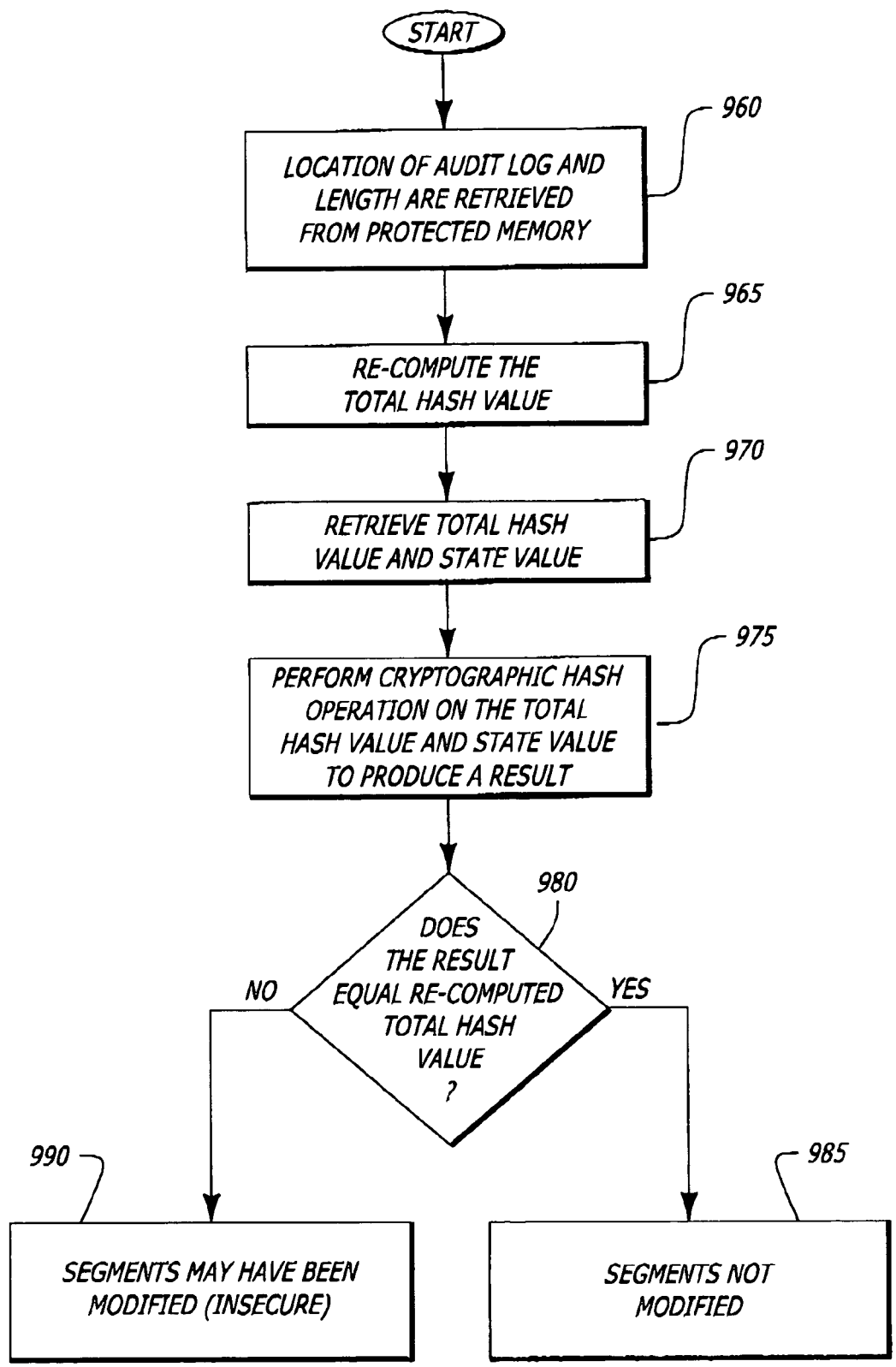
FIG. 9B is a flowchart of the illustrative operations of the platform of FIG. 6 to utilize the protected audit log.

To determine whether the audit log is correct, as shown in FIG. 9B, the total hash value may be re-computed from the audit log by accessing the location and length parameters from the protected memory (blocks 960 and 965). Also, the current total hash value can be computed from the state value and the total hash value stored in the protected memory (blocks 970 and 975). If these hash values compare, then the information presented by the log entries has not been modified and the audit log has not been tampered with (blocks 980 and 985). However, if these hash values differ, an error signal is provided to indicate that the loaded information has been tampered with (block 990).

Figure 10:
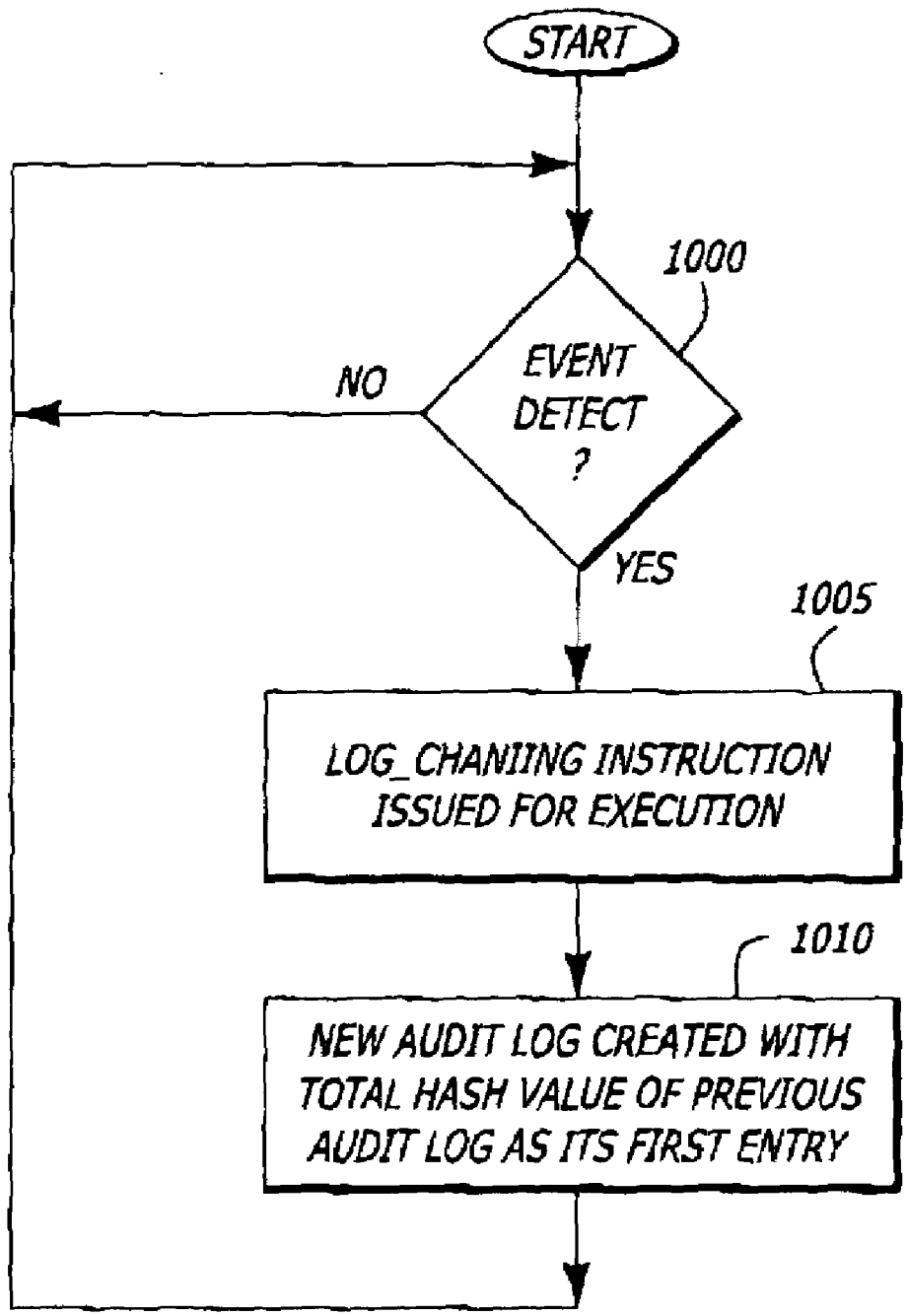
FIG. 10 is an illustrative diagram of another embodiment of the operations of the platform to generate a protected audit log collectively residing in both protected and unprotected memory.

Referring to FIG. 10, an illustrative diagram of an embodiment of the operations of the platform to generate a protected audit log accounting for modules loaded during the life of the platform is shown. At least a portion of the protected memory is non-volatile such as flash or battery-backed random access memory (RAM). The non-volatile memory is configured to contain the total hash value of the audit log.

Upon detecting an event such as new power-on cycle or the size of the audit log in the current power cycle exceeds a predetermined size, a LOG_CHAINING instruction is issued for execution by the processor (block 1000 and 1005). In response to execution of the LOG_CHAINING instruction by the processor, a new audit log is started with the total hash value of the previous audit log recorded as its first entry (block 1010). Thus, since hashing operations are an incremental process, the hash value for the entire product cycle of the platform may be preserved by repeating these operations for every subsequent event.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A platform comprising:
    a processor capable of operating in an isolated execution mode within a ring O operating mode, wherein the processor also supports one or more higher ring operating modes, as well as a non-isolated execution mode within at least the ring O operating mode;
    a system memory responsive to the processor, the system memory to include an isolated memory area and a non-isolated memory area, wherein the platform only allows access to data in the isolated memory area when the processor is operating in the isolated execution mode; and
    system logic to generate a log entry for an audit log in response to a segment of information being loaded into the isolated memory area, the log entry to represent the segment of information.

2. A platform according to claim 1, further comprising:
    protected memory responsive to the processor; and
    system logic to store the log entry in the protected memory.

3. The platform of claim 2, wherein the protected memory comprises single-write, multiple-read control registers.

4. The platform of claim 2, further comprising:
    an input/output control hub responsive to the processor, the input/output control hub comprising the protected memory.

5. The platform of claim 1, wherein the segment of information comprises at least part of a software module.

6. The platform of claim 1, wherein the log entry comprises a hash of the segment of information.

7. The platform of claim 6, further comprising:
system logic to generate a total hash value for the audit log, the total hash value to represent one or more log entries.

8. A platform according to claim 1, further comprising:
protected memory responsive to the processor; and
system logic to store a pointer to the audit log in the protected memory.

9. A platform according to claim 8, further comprising:
system logic to perform at least one operation from the group consisting of:
storing data to represent a length of the audit log in the protected memory; and
storing a total hash value of the audit log in the protected memory.

10. A platform according to claim 1, further comprising:
protected memory responsive to the processor; and
system logic to store a state value in the protected memory, the state value to include at least one item from the group consisting of:
a series of hash values stored in a block of memory;
a state pointer to identify locations of the hash values within the block of memory; and
data to represent a length of the audit log.

11. A platform according to claim 1, further comprising system logic to perform operations comprising:
storing the log entry in the audit log; and
after storing the log entry, determining a security state by:
computing a current hash value for at least one segment of information stored in the isolated memory area; and
comparing the current hash value to data from the audit log.

12. A method comprising:
storing a segment of information in an isolated memory area within a platform; wherein the platform comprises a processor capable of operating in an isolated execution mode within a ring O operating mode; wherein the processor also supports one or more higher ring operating modes, as well as a non-isolated execution mode within at least the ring O operating mode; and wherein the platform only allows access to information in the isolated memory area when the processor is operating in the isolated execution mode; and
generating a log entry for an audit log for the platform, the log entry comprising data representing at least the segment of information stored in the isolated memory area.

13. The method of claim 12, wherein the audit log comprises data representing segments of information loaded into the isolated memory area during a current power cycle of the platform.

14. The method of claim 12, wherein the log entry comprises a hash value of a software module loaded into the isolated memory area.

15. The method of claim 12, further comprising:
storing the log entry in the audit log; and
after storing the log entry in the audit log, determining a security state by:
computing a current hash value for at least one segment of information stored in the isolated memory area; and
comparing the current hash value to data from the audit log.

16. The method of claim 12, further comprising:
storing, within protected memory of the platform, at least one item from the group consisting of:

a pointer to a memory address of the audit log;
data to represent a length of the audit log;
a total hash value of the audit log; and
a state value comprising a series of hash values to represent respective segments of information stored in the isolated memory area.

17. The method of claim 16, further comprising:
performing a cryptographic hash operation on the state value to produce an updated total hash value.

18. The method of claim 12, further comprising:
storing, within protected memory of the platform, a total hash value of the audit log; and
after storing the total hash value, determining a security state by:
re-computing a total hash value; and
comparing the re-computed total hash value to the total hash value stored in the protected memory.

19. The method of claim 12, further comprising:
storing, within protected memory of the platform, a total hash value of the audit log;
after storing the total hash value, loading a new segment of information into the isolated memory area; and
using the total hash value from the protected memory to verify the audit log before updating the total hash value in accordance with the new segment of information.

20. An article, comprising:
a machine-accessible medium; and
instructions in the machine-accessible medium, wherein the instructions, when executed by a processing system, cause the processing system to perform operations comprising:
storing a segment of information in an isolated memory area within the processing system; wherein the processing system comprises a processor capable of operating in an isolated execution mode within a ring O operating mode; wherein the processor also supports one or more higher ring operating modes, as well as a non-isolated execution mode within at least the ring O operating mode; and wherein the processing system only allows access to information in the isolated memory area when the processor is operating in the isolated execution mode; and
generating a log entry for an audit log, the log entry comprising data to represent at least the segment of information stored in the isolated memory area.

21. An article according to claim 20, wherein the audit log comprises data representing segments of information loaded into the isolated memory area during a current power cycle of the processing system.

22. An article according to claim 20, wherein the instructions cause the processing system to store the audit log in a protected memory of the processing system.

23. An article according to claim 20, wherein the instructions cause the processing system to store a pointer to the audit log in a protected memory of the processing system.

24. An article according to claim 20, wherein the instructions cause the processing system to perform further operations comprising:
storing the log entry in the audit log; and
after storing the log entry, determining a security state by:
computing a current hash value for at least one segment of information stored in the isolated memory area; and
comparing the current hash value to data from the audit log.

25. An article according to claim 20, wherein the instructions cause the processing system to storing, within protected memory of the processing system, at least one item from the group consisting of:
 a pointer to a memory address of the audit log;
 data to represent a length of the audit log;
 a total hash value of the audit log; and
 a state value comprising a series of hash values to represent respective segments of information stored in the isolated memory area.

* * * * *